US012664253B2

(12) United States Patent
Lourenco et al.

(10) Patent No.: US 12,664,253 B2
(45) Date of Patent: Jun. 23, 2026

(54) AUTOMATED ONLINE POLICY GENERATION FOR ZERO-TRUST ARCHITECTURES

(71) Applicant: Dell Products L.P., Round Rock, TX (US)

(72) Inventors: Vitor Lourenco, Niterói (BR); Werner Freund, Rio de Janeiro (BR); Roberto Stelling, Rio de Janeiro (BR); Iam Palatnik, Rio de Janeiro (BR); Vicente Amorim, João Monlevade (BR)

(73) Assignee: DELL PRODUCTS L.P., Round Rock, TX (US)

( * ) Notice: Subject to any disclaimer, the term of this patent is extended or adjusted under 35 U.S.C. 154(b) by 275 days.

(21) Appl. No.: 18/310,804

(22) Filed: May 2, 2023

(65) Prior Publication Data

US 2024/0370551 A1 Nov. 7, 2024

(51) Int. Cl.
*G06F 21/45* (2013.01)

(52) U.S. Cl.
CPC ................................. *G06F 21/45* (2013.01)

(58) Field of Classification Search
CPC ...................................................... G06F 21/45
See application file for complete search history.

(56) References Cited

U.S. PATENT DOCUMENTS

| | | | | |
|---|---|---|---|---|
| 2019/0034780 A1* | 1/2019 | Marin | ................. | G06F 16/3329 |
| 2019/0205773 A1* | 7/2019 | Ackerman | .............. | G06F 30/20 |
| 2021/0173874 A1* | 6/2021 | Giddings | ............... | G06N 20/00 |
| 2023/0319115 A1* | 10/2023 | Shah | .................... | H04L 63/205 |
| | | | | 726/1 |

FOREIGN PATENT DOCUMENTS

| | | | | | |
|---|---|---|---|---|---|
| CN | 113918832 A | * | 1/2022 | ............. | G06N 3/045 |
| EP | 2731020 A1 | * | 5/2014 | ......... | G06F 16/9024 |
| JP | 7064576 B2 | * | 5/2022 | ......... | G06F 21/6254 |
| WO | WO-2019073894 A1 | * | 4/2019 | ............. | G06F 18/22 |

OTHER PUBLICATIONS

DISA and NSA, "Department of Defense Zero Trust Reference Architecture," Version 1.0, https://dodcio.defense.gov/Portals/0/Documents/Library/(U)ZT_RA_v2.0(U)_Sep22.pdf, Sep. 12, 2022.

* cited by examiner

*Primary Examiner* — Shewaye Gelagay
*Assistant Examiner* — Carlton Johnson
(74) *Attorney, Agent, or Firm* — Amin, Turocy & Watson, LLP

(57) ABSTRACT

Architectures and techniques are described that can automatically (as opposed to manually) generate a new policy in a zero trust architecture (ZTA) or environment, for instance, when it is determined that a current network activity does not have a suitable policy that can be applied, which can be determined by a policy enforcement point (PEP) of a ZTA. To comply with ZTA principles, the new policy can be determined based on data-driven analytics of network activities and can therefore be suitable for online use.

20 Claims, 11 Drawing Sheets

500

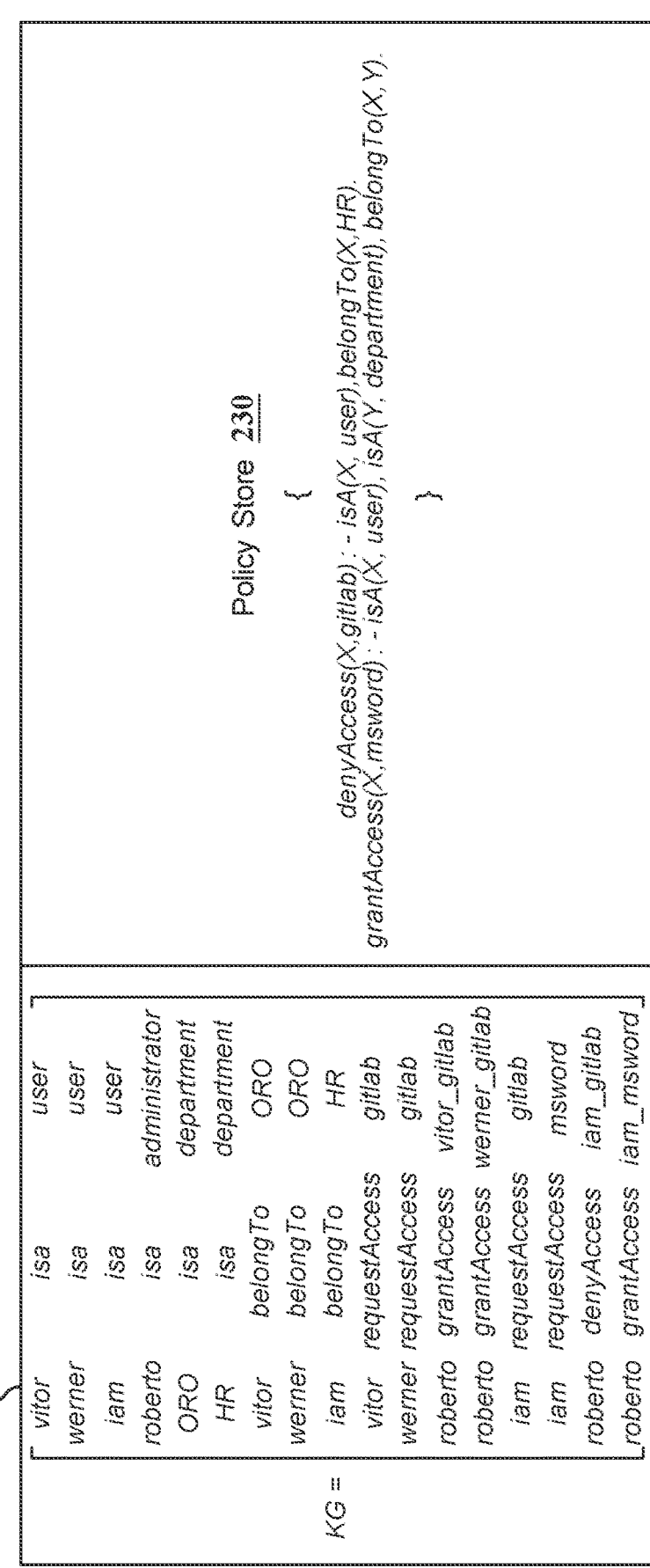

210

KG =

| | | |
|---|---|---|
| vitor | isa | user |
| werner | isa | user |
| iam | isa | user |
| roberto | isa | administrator |
| ORO | isa | department |
| HR | isa | department |
| vitor | belongTo | ORO |
| werner | belongTo | ORO |
| iam | belongTo | HR |
| vitor | requestAccess | gitlab |
| werner | requestAccess | gitlab |
| roberto | grantAccess | vitor_gitlab |
| roberto | grantAccess | werner_gitlab |
| iam | requestAccess | gitlab |
| iam | requestAccess | msword |
| roberto | denyAccess | iam_gitlab |
| roberto | grantAccess | iam_msword |

Policy Store  230

{ denyAccess(X,gitlab) :- isA(X, user), belongTo(X, HR).
grantAccess(X,msword) :- isA(X, user), isA(Y, department), belongTo(X, Y).

AUTOMATED ONLINE POLICY GENERATION FOR ZERO-TRUST ARCHITECTURES

BACKGROUND

A Zero Trust Architecture (ZTA) is IT infrastructure that complies with Zero Trust (ZT) requirements. ZT is a cyber security approach that focuses on users, assets, and resources. Conceptually, ZT has as central idea that trust is never granted implicitly, therefore a goal is to continuously verify network activity.

Generally, in a ZTA, policies are applied by a Policy Enforcement Point (PEP), where current specifications that describe a Zero-Trust Reference Architecture foresee one PEP per ZT pillar: user, device, network, application, and data, which are detailed in DISA and NSA, 2021, Department of Defense Zero Trust Reference Architecture, Version 1.0, which is incorporated herein by reference in its entirety. In other words, one PEP can enforce policies for users, a second PEP can enforce policies for devices, a third PEP can enforce policies for networks, a fourth PEP can enforce policies for applications, and a fifth PEP can enforce policies for data.

Current approaches rely on manually crafting policies for each PEP in advance, for example, by one or more security specialists.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 5 is a block diagram 500 illustrating an example KG-based activity store 210 and an associated policy store 230 in a ZTE in accordance with certain embodiments of this disclosure;

DETAILED DESCRIPTION

Overview

Figure 1:
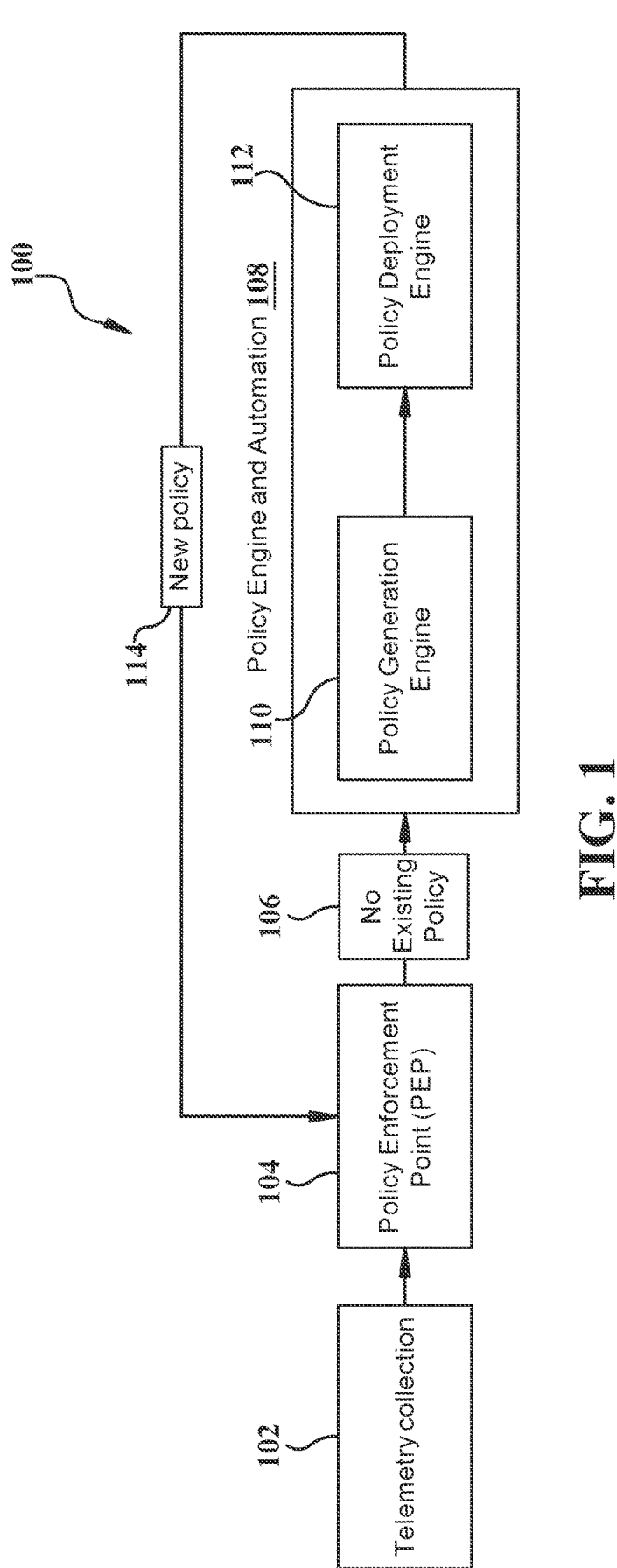
FIG. 1 illustrates a schematic block diagram 100 of a simplified view of a ZTA having a policy engine and automation device in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In the context of a ZTA, existing approaches rely on manually crafting rules for each PEP. For example, previous ZTA systems have implemented open policy access (OPA), which is a policy-based controller that requires the use of a declarative language to create a policy file to delimit the trustable zones and continuously verify agents. As noted, these existing policies are manually created in advance for a given target environment. From an execution perspective, current OPA controllers can enforce existing policies, but in the context of online access, unless an applicable policy already exists for a given activity, online access cannot be processed in a timely manner except via a naïve policy such as "deny all new activities" or the like.

In addition to not being suitable for online environments, existing approaches, in which policies are manually constructed in advance by experts, can lack scalability and can suffer from complexity issues or may encode human errors or biases.

The disclosed subject matter is directed to a policy engine and automation device for a ZTA environment that can automatically and dynamically generate policies based on analytics. For example, if a particular activity (e.g., a given user attempts to install a given application) is not covered by an existing policy, new policies can be automatically generated from previous activities that may be covered by existing policies or other network activity/telemetry from any suitable data source. Because new policies can be dynamically generated, rather than wait for a human actor to craft the new policy that covers the new activity, the policy engine and automation device can operate in an online environment which can lead to improved user experiences in online environments.

Furthermore, because the policy engine and automation device can generate policies automatically (e.g., based on network activities/telemetry) such policies can meet ZT requirements and also allow the platform to provide ZTA compatible technology to clients and partners. However, it is noted that data-driven policy generation in ZTAs can rely on processing of large data volumes with complex structures, e.g., high dimensional representations and multiple indirect interactions between entities. Such represents yet another challenge that can be addressed by the disclosed techniques.

By way of introduction, FIG. 1 illustrates a schematic block diagram 100 of a simplified view of a ZTA having a policy engine and automation device in accordance with certain embodiments of this disclosure. In this simplified view of a ZTA, interaction between the network activity (e.g., represented as telemetry collection 102), the PEPs (e.g., represented by PEP 104), and policy engine and automation 108 are demonstrated in FIG. 1. In the context of the disclosed techniques, new policy generation and new policy deployment are broken into individual stages. Hence, policy engine and automation 108 can comprise policy generation engine 110 to handle automated generation of new policies for network activities that do not have an existing policy (e.g., indicated by reference numeral 106), and policy deployment engine 112 to handle the deployment of those new policies.

In a simple approach, a possible form of policy deployment engine 112 can use a Human in the Loop (HITL) approach and query an expert based on the generated policies. To allow online operation, a pre-defined temporary approach can be employed while the HITL verifies the temporary policy. Possible options could be to employ a naïve policy, e.g., deny all activities without rules; to employ the generated policy with highest likelihood; or to use a more complex logic, e.g., depending on the sensitivity of the activity, among others. Additional detail with respect to policy engine and automation 108, policy generation engine 110, and policy deployment engine 112 can be found with reference to FIGS. 2 and 3.

It is to be understood that a significant benefit of policy engine and automation 108 is the ability to automatically generate policies for new activities in a network or cyber network for which there are no existing applicable policies 106. Thus, policy engine and automation 108 is therefore capable of complying with ZTA requirements.

Another advantage of policy engine and automation 108 is scalability. Latent representations employed by techniques disclosed herein can allow policy engine and automation 108 to efficiently process large data volumes, as is the case of an activities database or store of any typical ZTA.

Another advantage of policy engine and automation 108 is online operation capability. Latent representations employed by the disclosed techniques can allow policy engine and automation 108 to perform efficient computations, with linear growth on time and memory space with regard to the latent space dimension. Additionally, matrices computations can benefit from all technology advances in AI accelerator hardware (e.g., GPUs etc.). Such can allow low latency generation of candidate policies, and thus online operation. These candidate policies can be employed as temporary decisions while the validation system does not provide a final decision.

Another advantage of policy engine and automation 108 is that the disclosed techniques can be applied in a ZT pillar-agnostic manner. Policy engine and automation 108 can represent and process information across any ZT pillar (e.g., user, device, network, application, and data) in a unified way. Hence, the disclosed techniques can be agnostic in terms of which pillar an activity is being parsed. Therefore, the disclosed techniques can abstract from which pillar PEP 104 and telemetry representation is coming from. Moreover, the disclosed techniques can provide new policies across any ZT pillar. Such can be achieved by leveraging a flexible graph-based representation of the data and by processing a latent representation of such information.

One potential approach is to use knowledge graphs (KG). However, KG symbolic reasoning is known to suffer from slow response time in larger and denser graphs. As another advantage, the disclosed techniques can substantially mitigate previously understood shortcomings of KGs, thereby providing a solution that is both reliable and scalable for new police generation, while meeting the constraints of online response time.

Still referring to FIG. 1, in some embodiments, it can be assumed that cyber network activities (e.g., represented by telemetry collection 102) among various ZT pillars (e.g., user, device, network, application, and data) can be collected and stored to an activity store (not shown, but see activity store 210 of FIG. 2) that contains relevant historical network activities. In some embodiments, this activity store can be represented as a KG. A KG can be understood as any data where its entities are represented as nodes and relationships as edges.

As defined in ZTAs, network activities in each pillar can be evaluated by a corresponding PEP 104. In some embodiments, it can be assumed that the various PEPs 104 rely on a logical framework. Whenever a PEP 104 encounters an activity without an underlying policy (e.g., logical rule) in an associated policy store (not shown, but see policy store 230 of FIG. 2), policy engine and automation 108 can operate in the following ways.

In some embodiments, a machine learning (ML) system can be employed to summarize the relevant content in the activity store, therefore mitigating the challenges of processing complex ZTA data by unveiling latent representations of the entities and activities in the activity store. In some embodiments, latent representations can be employed to uncover a set of most likely specific information underlying the new activity, e.g., to specify a set of entities and relational paths that are associated to such information. In some embodiments, a set of specific information can then automatically be generalized into candidate policies with a rule learning engine. In some embodiments, candidate policies can then be fed to policy deployment engine 212, which can determine how the candidate policies are to be employed, e.g., whether they are appended to the policy database, fixed in some way, or discarded.

Example Systems

Figure 2:
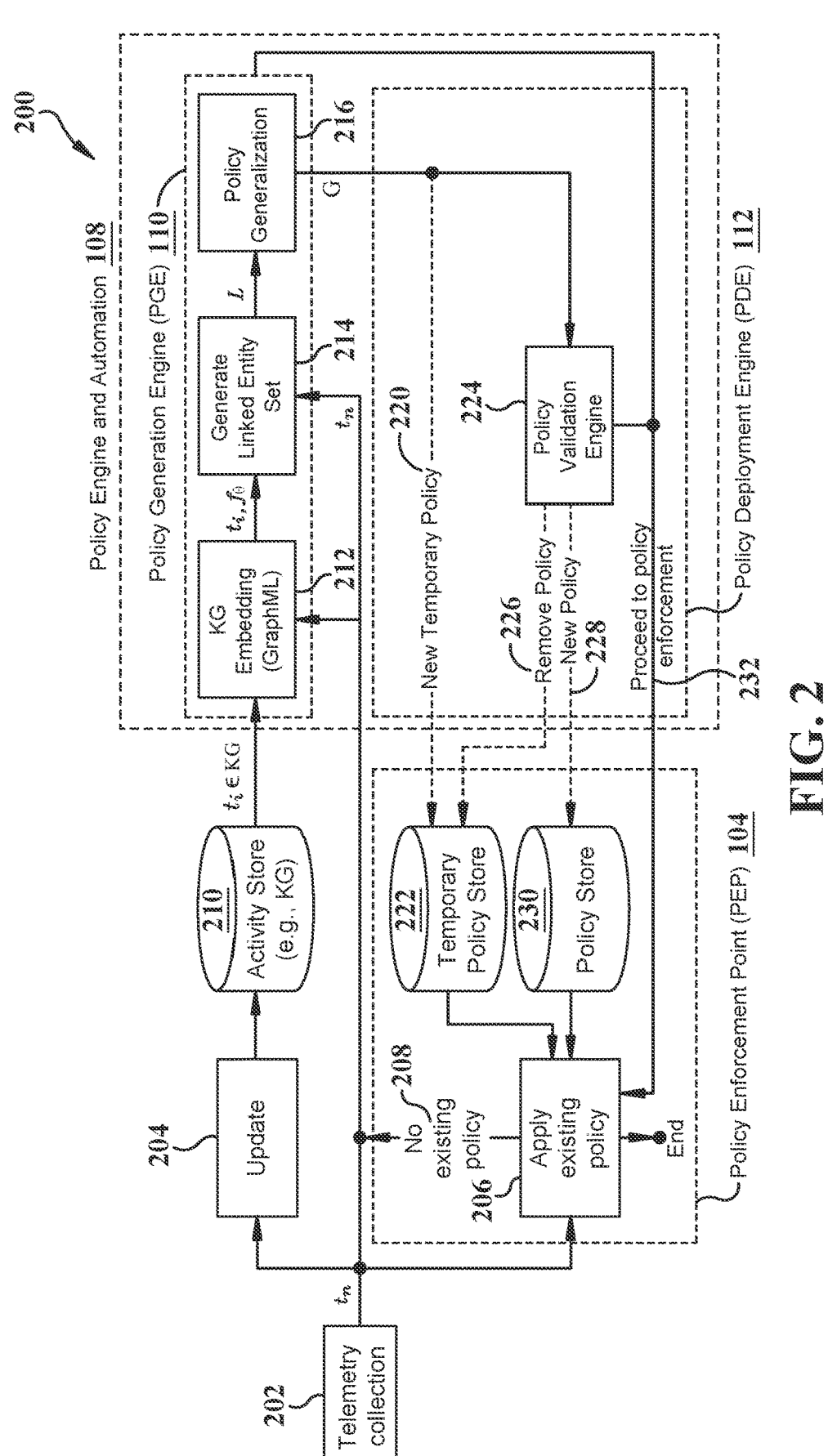
FIG. 2 depicts a schematic block diagram 200 illustrating an example system that can automatically generate new policies for network activity in a ZTA in accordance with certain embodiments of this disclosure.

Referring now to FIG. 2, a schematic block diagram 200 is depicted illustrating an example system that can automatically generate new policies for network activity in a ZTA in accordance with certain embodiments of this disclosure. As detailed, policy engine and automation device 108 can be implemented to effectuate dynamic generation of new policies online for ZTAs. Hence, whenever a given activity (e.g., user U attempts to install application A) does not have an applicable policy, one can be generated dynamically. For example, a graph-based ML technique can be leveraged to learn patterns from previously monitored network activities, which can potentially describe new behaviors within a zero-trust environment (ZTE) that can be mapped to new schemas and logic rules.

Prior to detailed discussion of policy engine and automation device 108, certain potential implementation details can be considered. Activity store 210 can represent a data store for network activity, which can be based on telemetry data such as from telemetry collection 202 that results from network activity. The format of activity store 210 can be in accordance with any suitable format. As one example, the disclosed techniques can operate based on KGs. For example, telemetry data can be consumed by a KG. KG information can be conceptual representation of a fact, such as some network activity captured by telemetry collection 202. Thus, the KG can be built upon many different already existing storages, such as relational databases, graph databases, and triple stores to name a few. A KG can provide a flexible database that can efficiently consume irregular and arbitrary data points, therefore being appropriated to store cyber security data from multiple ZT pillars. To ease the overall understanding, as one possible implementation for the disclosed techniques, a KG can be built upon a triple store.

In the context of a triple store, each activity (telemetry element) can be registered as a set of tuples in the format (s, p, o) called a triple, where s stands for subject, o for object, and p for predicate. For instance, an activity of a user U attempting to install an application A will be registered as the tuple of triples [(U, is_a, User), (A, is_a, Application), (U, installs, A)], which can be readable as "a user U installs an application A". An edge case in some embodiments can be that when the initial KG is empty, in this case, the capabilities of generating new reliable policies is limited, but mitigated with the environment usage.

With respect to certain ontology, KGs can be complemented with high-level semantic information that specifies how the entities and relationships are governed within a data store or the like. This specification can be defined on so-called ontologies, and can encompass elements such as classes, properties, formal naming, among others.

With regard to reasoning frameworks, a set of policies can be built using a vast number of already existing solutions, to name a few, Prolog expressions, relational databases, among others. In the examples set forth herein, policies are illustrated as Prolog expressions but it is understood that other implementations are conceived and can be suitable.

A policy represented as a Prolog expression can be called a rule and can be written following, e.g., the Horn clause notation, where a valid rule expression has the formulae left_hand_side:—right_hand_side easily interpretable as: left_hand_side if right_hand_side, where left_hand_side can be a positive atomic expression and right_hand_side can be a composition of facts and/or other rules.

To exemplify, following the previous example, a policy that allows the user u to install the application a can be written as allow_installation(u,a):—is_user(u), is_application(a), install(u,a), readable as "allow installation of a by u if u is a user, a is an application, and u is trying to install a". The initial set of policies can be empty, which limits the controller capabilities, or filled with initial basic statements provided by other software or human workforce.

With regard to verifying existing policies, the disclosed techniques can query a policy set to verify existing applicable policies. In the same context of Prolog expressions, this could be done by a Prolog interpreter, which will assume that activity is true and will try to prove its truthiness by reasoning over the existing rules. It is appreciated that other verification mechanisms are envisioned. For example, other verification mechanisms could be implemented, such as SQL queries in case of relational databases, GraphQL queries in case of graph databases, and SPARQL or Gremlin in case of triple stores. Regardless of the particularly implementations, in cases where the interpreter proves the query to be true, the system can employ the existing policy. On the other hand, if the query is not proven to be true, the system will try to generate new policies.

Figure 3:
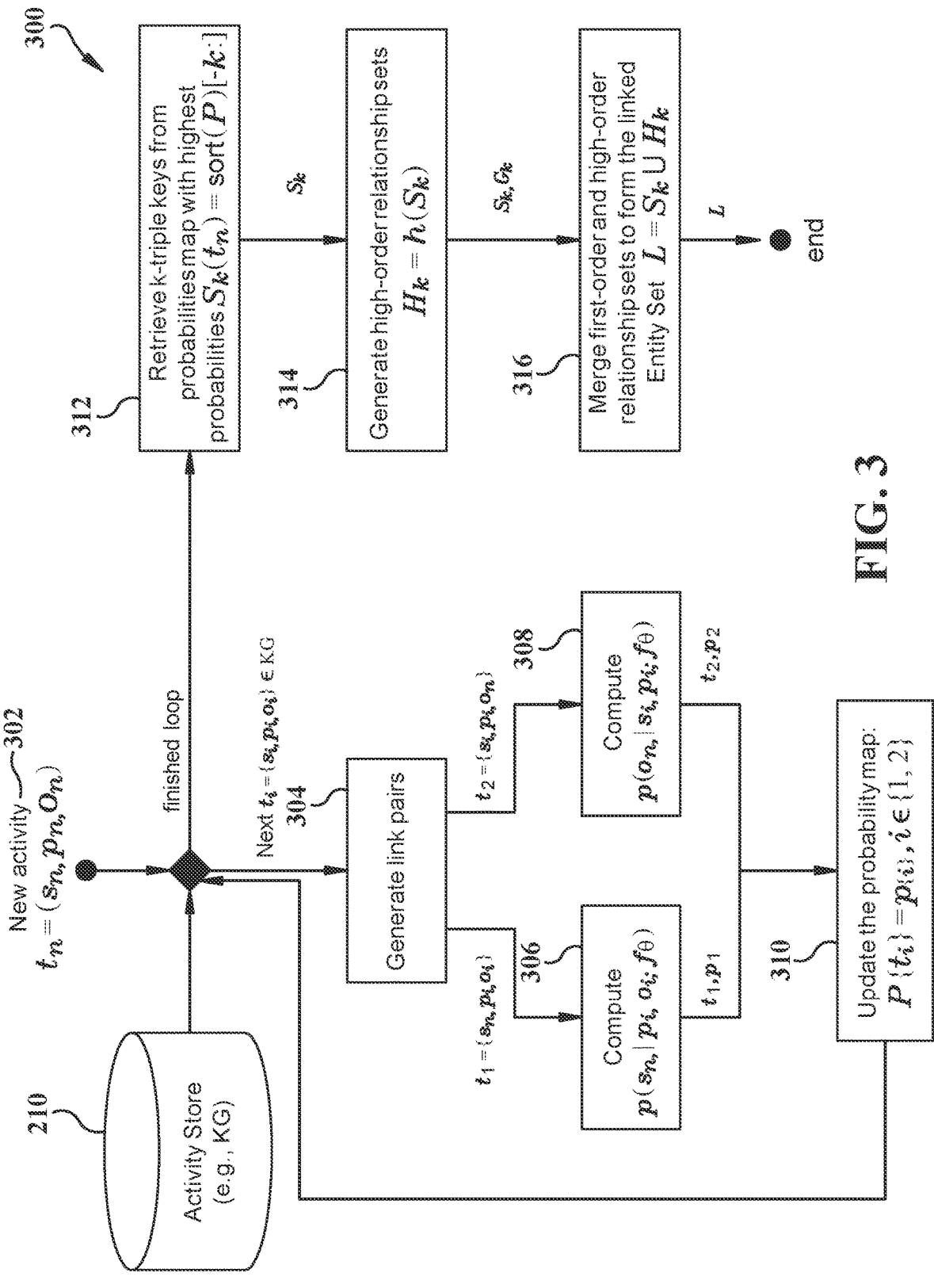
FIG. 3 depicts a schematic block diagram 300 illustrating an example system that can generate a linked entity set in accordance with certain embodiments of this disclosure.

Thus, FIGS. 2 and 3 relate to one specific implementation that is detailed above, although many other variations can exist with different implementation details. In contrast, FIG. 6 relates to a more generalized implementation.

Still referring to FIG. 2, in some embodiments, the disclosed techniques focus on policy engine and automation 108, which can include policy generation engine (PGE) 110 and policy deployment engine (PDE) 112 that can be deployed in a ZTA. Specific details of PGE 110 and PDE 112 are discussed in separate stages according to the example implementation indicated above, noting that other implementations are possible.

Initially, a ZTA can receive data from telemetry collector 202. Said data can be a generated set of triples (s, p, o) that represents some network activity. The ZTA framework can update 204 activity store 210 and evaluate in PEP 104 the existence of applicable policies. If there are any applicable policies to apply to the network activity, the system can proceed with their enforcement by applying an existing policy to the network activity, indicated at reference numeral 206. In the other case where no existing policy is found, indicated at reference numeral 208, the ZTA framework invokes PGE 110, for instance to generate a new policy.

In some embodiments, PGE 110 can comprise three primary elements, namely KG embedding 212, generate linked entity set 214, and policy generalization 216. KG embedding can provide a learned latent representation (also referred to herein as an "embedding") of KG entities and relations found in activity store 210 and is further detailed here in FIG. 2. Generate linked entity set 214 can relate to identifying underlying patterns existing among the activity learned representations by generating new candidate relationships and relational paths. Such can operate to semantically bound policy identification and is further detailed in connection with FIG. 3. Policy generalization 216 can be directed to generalizing a candidate policy (e.g., to apply to other network activities) and translation to a new policy, and is further detailed in connection with FIG. 4.

With regard to KG embedding 212, initially, PGE 110 can employ modern graph-based ML models with a mathematical form $f_\theta$. Their purpose can be twofold. First, this implementation can be used to learn a mathematical space, so-called distributional, latent, or embedding space, where the symbolic entities and relations can be numerically computed. Possible embodiments can be to train a graph-based machine learning model to learn the embedding space of the activity store 210, which in this case is a KG.

Second, the graph-based ML model can infer the embeddings of existing or new entities and representations. An exemplary form can be to use the trained model to retrieve the embeddings of existing entities and relations or approximate new entities and relations to existing ones targeting to obtain new unique representations, such as is done by multiple existing open-world methods of representation learning on knowledge graphs.

By approaching the problem this way, the system can reduce the computational burden for online operation while still preserving statistically relevant information for downstream evaluation.

While still referring to FIG. 2, but turning now as well to FIG. 3, a schematic block diagram 300 is depicted illustrating an example system that can generate a linked entity set in accordance with certain embodiments of this disclosure. Here policy engine and automation 108 and/or PGE 110 can start based on information included in activity store 210, with its underlining learned patterns and the same new activity triples set. The system can evaluate the existence of new relationships or chains of relationships (e.g., missing triples or relational paths) among the KG entities and identify policies based on their underlying semantics.

Holistically, PGE 110 can seek to determine an estimated top-k candidate triples that link the new activity, $t_n$, to a known activity $t_i \in KG$. In some embodiments, these top-k candidate triples can represent a linked entity set, L, and can be determined as follows.

At reference numeral 304, provided $t_n = \{s_n, p_n, o_n\}$, for each $t_i = \{s_i, p_i, o_i\} \in KG$, build the possible link pairs between $t_n$ and $t_i$, and let them be denoted by $t_1 = \{s_n, p_i, o_i\}$ and $t_2 = \{s_i, p_i, o_n\}$. Next, compute associated probabilities of the linked pairs, as illustrated at reference numerals 306 for the probability of $t_1$ and 308 for the probability of $t_2$. In some embodiments, computation of probabilities $p(x_n | x_i; f_\theta)$, where $x_n$ is the entity from $t_n$, $x_i$ the predicate and entity from $t_i$ and $f_0$ is the graph-embedding mapping.

Potential embodiments of $p(x_n | x_i; f_\theta)$ can be based on template matching functions as those derived using distance computations on top of the embedding space.

At reference numeral 310, a probability map can be updated. For example, results can be stored in the dictionary P mapping the possible link pairs to their probabilities. In some embodiments, the probability map can be sorted. For example, the newly formed triples can be sorted accordingly to the highest probabilities.

At reference numeral 312, k-triple keys can be retrieved from the probability map with the highest probabilities. Such can represent retrieval of the top-k links being the most likely to generate useful policies. For example, $S_k(t_n) = \text{sort}(P)[-k:]$. It is noted that $S_k$ may provide only the generation of triples having first-order neighbor relationships. To generate high-order relationships, and consequently, more complex policies, a further step can be implemented.

For example, at reference numeral 314, high-order relationship between candidate links can be generated. This operation can be performed by leveraging relational paths. For example, let $s \to_m o$ denote a relational path, representing chains of up to m predicates between a subject, s, and an object, o. That is, $S \to_m o = (s, \{p_1, p_2, \ldots, p_m\}, o)$. Thereafter, high-order relationships can be generated for $S_k$ and the set $H_k = h(S_k) = \{s_i \to_m o_i | t_i \in S_k\}$ of the top-k most probable relational paths can be retrieved. Viable approaches to compose $h(\cdot)$ and obtain these chains are, for example, employing a breath-first search algorithm with start node being the subject, s, graph flow algorithms using the subject, s, and object, o, being the source and sink nodes, respectively, among others.

At reference numeral 316, first-order and high-order relationship sets can be merged. As a result of this merging, a resulting set $L = S_k \cup H_k$ can represent the linked entity set, L. The linked entity set can be a set of instantiated clauses of the new candidate policies that connect entities through relations. Retrieving the linked entity set in this manner can all the disclosed solution to leverage online model inferences, provided that computations can be performed efficiently on top of the embeddings representations.

Figure 4:
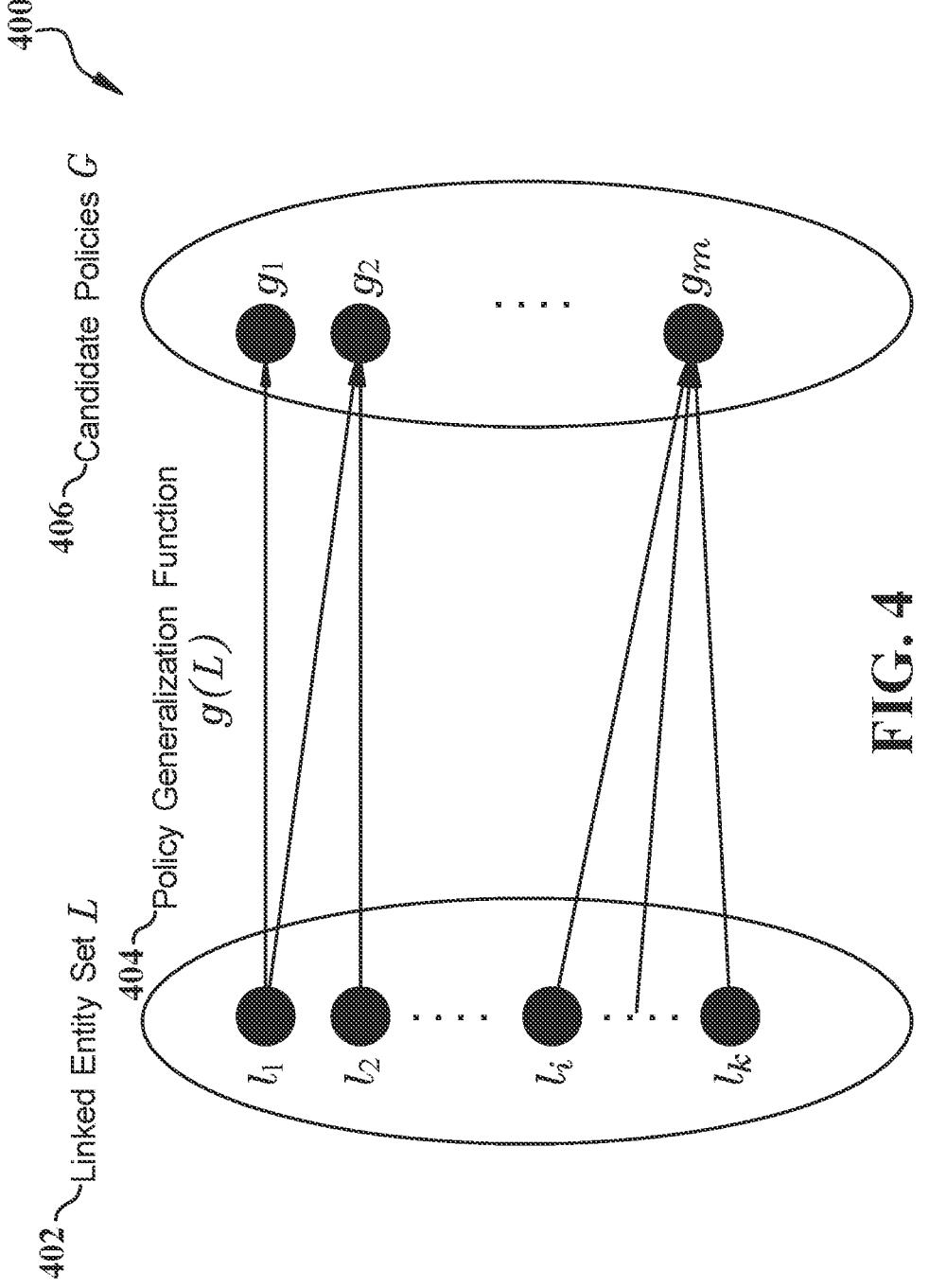
FIG. 4 illustrates a schematic diagram 400 depicting an example of policy generalization based on the linked entity set 402 in accordance with certain embodiments of this disclosure.

While still referring to FIG. 2, but turning now as well to FIG. 4, a schematic diagram 400 is depicted illustrating an example of policy generalization based on the linked entity set 402 in accordance with certain embodiments of this disclosure. Once the linked entity set 402, L, is determined, PGE 110 can use the linked entity set 402 to generalize associated clauses into candidate policies 406, which can be handled by policy generalization 216.

In that regard, based on the KG and/or information in activity store 210, PGE 110 can identify the types, properties, and relations of the entities and generalize the elements within to candidate policies 406 by turning each constant into its terminology correspondent. The terminology correspondent is already available at the activity store 210 through the existing ontology discussed above. Next, PGE 110 can aggregate candidate policies 406 into rules, which can be an automated process leveraging any suitable rule learning approach.

Formally, policy generalization can be represented as $G = g(L)$, which can be a function (e.g., policy generalization function 404) that maps elements from Linked Entity Set 402, L, to candidate policies 406, G, based on the ontology of activity store 210. The function is able to map the Linked Entity Set 402 elements to candidate policies 406 in the association form 1-1 and n-1. For instance, given the previous exposed scenario, where the system receives a new activity "a user U installs an application A" with no existing policy to fit it in and Linked Entity Set 402 being composed of the triples and relational paths [(u, installs, a), (u, allow_installation, installs, a)], the function 404 generalizes into policies 406 in the format allow_installation $(X,Y)$:—is_user $(X)$, is_application $(Y)$, install $(X,Y)$, where X and Y can be any existing user and application, respectively, based on the ontology that describes the activity store 210 instances.

Still referring to FIG. 2, once a candidate policy 406 has been determined, such can be treated as a new temporary policy 220 and stored to a temporary policy store 222. This candidate policy 406 can also be provided to policy validation engine 224. Potential outcomes can be to remove 226 the policy from temporary policy store 222 or to add the candidate policy 406 as a new policy 228 in policy store 230.

In order to illustrate the above-described techniques with a concrete example, consider FIG. 5. FIG. 5 is a block diagram 500 illustrating an example KG-based activity store 210 and an associated policy store 230 in a ZTE in accordance with certain embodiments of this disclosure. Suppose various users of a ZTA governing a company's access authentication system. The system has an activity store 210 that is implemented as a KG that stores and models ZTA activity data. The system also includes policy store 230 and a previously trained graph-based ML model f that is able to map entities and relationships to their corresponding embedding representation.

The KG can contain information regarding the system users, the company's departments that each user work in, the applications that user must authenticate to have access, and historical data of interactions between users, applications, and departments (e.g., past or known activities). The KG and policy store 230 can be filled with triples and rules, respectively, as shown in FIG. 5.

In this scenario, suitable devices (e.g., policy engine and automation device 108) can receive a new activity (e.g., from telemetry collector 202). The telemetry can describe a new user named Vicent and the department to which he belongs, and who has requested access to GitLab. In this case the new activity is received in triple format with a subject, predicate, and object, such as: [(vicent, isA, user), (vicente, belongTo, ORO), (vicente, requestAccess, gitlab)]. Hence, following the workflow of FIG. 2 and the techniques described therein, the system can operate as follows.

First, the system can update activity store 210 (e.g., a KG) with the new incoming triples, as indicated at update 204 of FIG. 2. In other words, the example KG illustrated in FIG. 5 can have new entries, namely the addition of [(vicent, isA, user), (vicente, belongTo, ORO), (vicente, requestAccess, gitlab)]. Next, the system can interact with an associated PEP 104 to evaluate if there are any applicable policies within the Policy Database. Since there are no policies that can be applied, our system provides the new activity to PGE 110.

A potential operation of PGE 110 in this scenario can be as follows. First, PGE 110 can retrieve the embedding representation of the new activity entities and relationships using the ML model f as detailed in connection with KG embedding 212. Next, PGE 110 can generate a set of linked entities 402 as detailed in connection with 214 of FIG. 2 and in more detail with respect to FIG. 3. For example, the system can match the existing entities and relationships in the activity store 210 with the new activity entities to form new triples and retrieve the top-k newly formed triples with the highest probability to be true. In our example, the top-1 most probable triple to be true is L=[(roberto, grantAccess, vicente_gitlab)].

Next, PGE 110 can use the Linked Entity Set 402, L, to generalize associated clauses into candidate policies 406. The Policy Generalization G, can rely on knowledge from activity store 210, and can observe that all users that belongs to ORO department have their request to access GitLab granted. Furthermore, adding the knowledge obtained by the new triple in L, the function G=g(L) can map the previous knowledge and the new triple to a generalized form described in the policy grantAccess (X, gitlab):—isA(X, user), belongTo(X, ORO).

Thereafter, policy engine and automation 108 can move from PGE 110 to PDE 112, thereby invoking the Policy Deployment Engine 112, where the new policy can be evaluated. For example, first, PDE 112 can validate the new policy, as detailed in connection with policy validation engine 224. Next, PDE 112 can add the new policy to policy store 230, as illustrated at reference numeral 228. Finally, the new policy can be enforced by PEP 104 in accordance with ZTA.

Therefore, in this example, the user vicente can immediately have GitLab access granted automatically. Moreover, future users that belongs to ORO will also have their access granted by virtue of PEP 104 enforcing the new policy that was generalized from the processing of Vicent's request.

Figure 6:
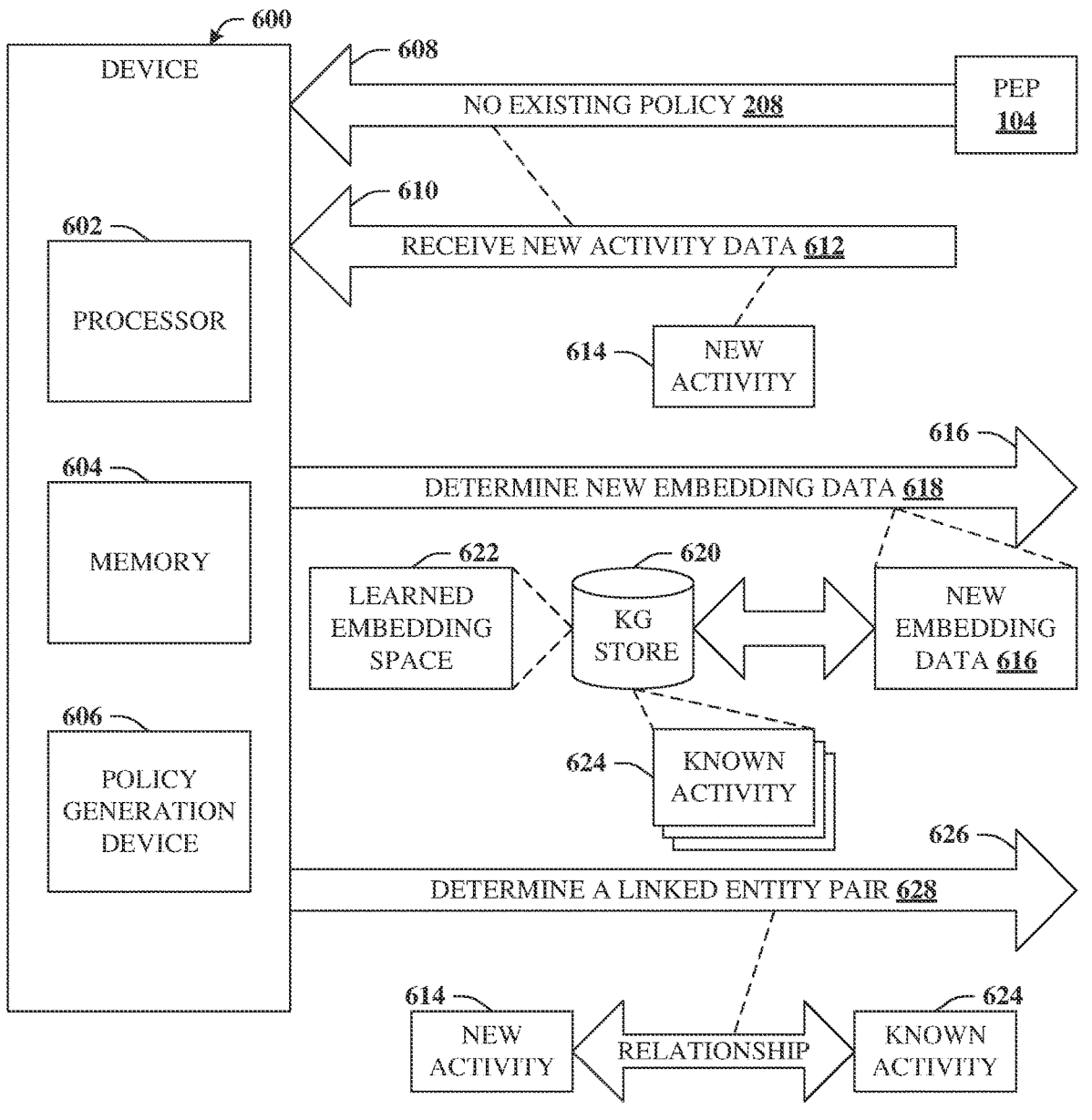
FIG. 6 depicts a schematic block diagram illustrating an example device 600 that can automatically generate policies for new activities in a network in compliance with ZTA requirements in accordance with certain embodiments of this disclosure.

Referring now to FIG. 6, a schematic block diagram is depicted illustrating an example device 600 that can automatically generate policies for new activities in a network in compliance with ZTA requirements in accordance with certain embodiments of this disclosure. Device 600 can comprise a processor 602 that can be specifically configured to perform function associated with assigning, updating, or migrating permissions. Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or policy generation device 606. Along with these special-purpose instructions, processor 602 and/or policy generation device 606 can be a special-purpose device. Further examples of the memory 604 and processor 602 can be found with reference to FIG. 11. It is to be appreciated that device 600 or computer 1102 can represent a server device or a client device of a network or network services platform and can be used in connection with implementing one or more of the systems, devices, or components shown and described in connection with FIG. 6 and other figures disclosed herein.

In some embodiments, device 600 can be embodied as policy engine and automation device 108, as detailed in FIG. 2. At reference numeral 608, PEP 104 of a ZTA can determine that new activity data 612 describing new activity 614 does not have an existing policy that can be applied to new activity 614. Such can be similar to no existing policy determination 208 of FIG. 2. In response to this determination by PEP 104, device 600 can receive new activity data 612, describing new activity 614, as illustrated at reference numeral 610. In some embodiments, new activity data 612 can be formatted as a triple comprising a subject, a predicate, and an object. In some embodiments, new activity data 612 can comprise a symbolic entity or a relationship between two or more symbolic entities.

At reference numeral 616, device 600 can determine new embedding data 618. New embedding data 618 can be indicative of a mathematical representation of symbolic information of new activity data 612. Furthermore, new embedding data 618 can conform to a learned embedding space 622 of an activity KG, such as KG store 620. Typically, KG store 620 can comprise known embedding data of known activity 624. As was detailed in connection with KG embedding 212, such can employ, for example, modern graph-based ML models with a mathematical form $f_\theta$.

In some embodiments, the learned embedding space can be a result of training of a graph-based ML model on the KG of KG store 620 that houses known activity data indicative of known activities 624. In some embodiments, the graph-based ML model can be configured to retrieve, from KG store 620, the known embedding data of existing entities and relationships or to approximate new entities or relationships for new activity data 612.

At reference numeral 626, device 600 can determine linked entity pair 628. Linked entity pair 628 can be indicative of a link between new activity 614 and known activity 624, as was discussed in connection with generate linked entity set 214 of FIG. 2 and/or generate link pairs 304 of FIG. 3.

Figure 7:
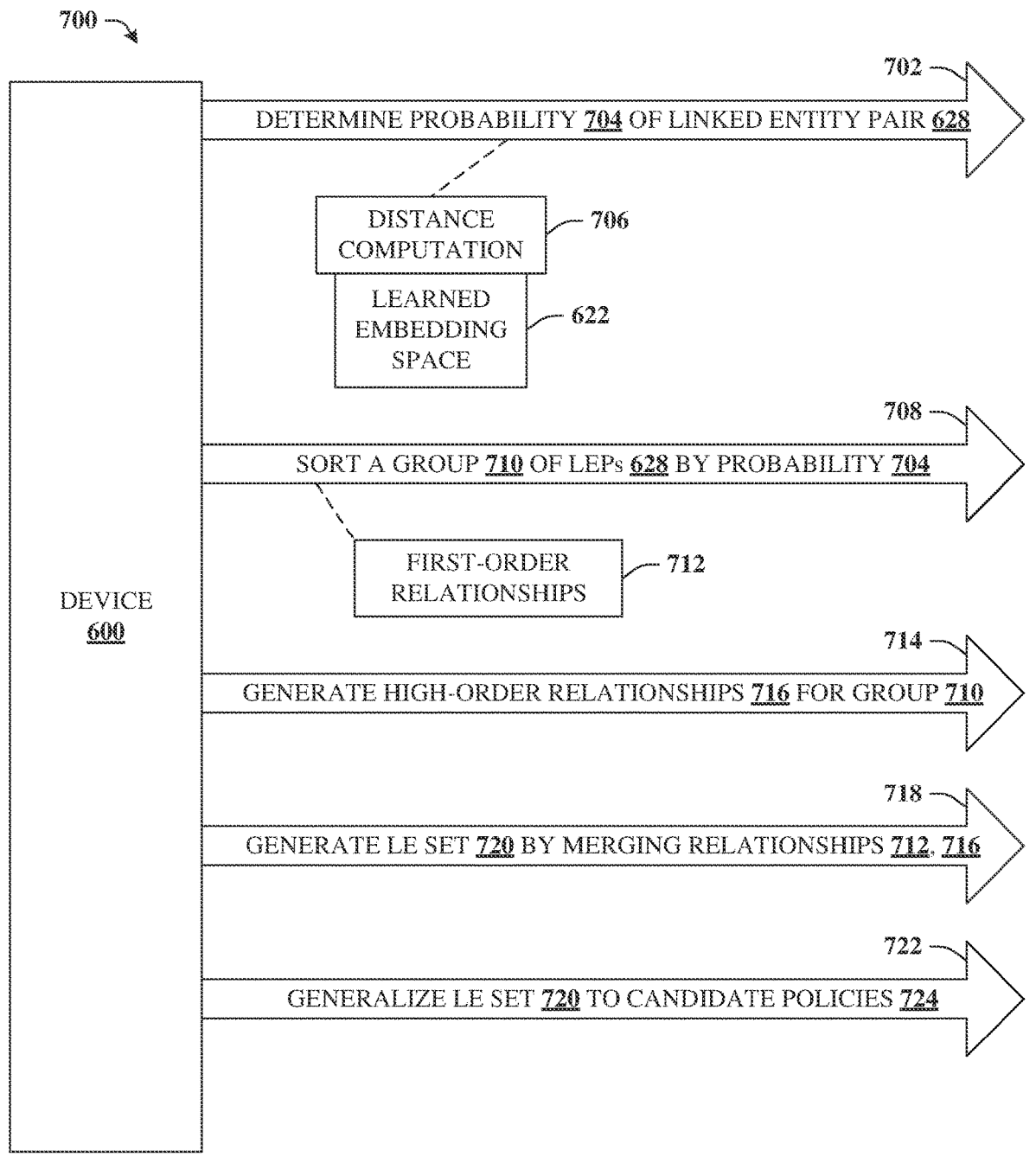
FIG. 7 depicts a block diagram illustrating additional aspects or elements of device 600 that can automatically generate policies for new activities in a network in compliance with ZTA requirements in accordance with certain embodiments of this disclosure.

Referring now to FIG. 7, block diagram 700 is presented. Block diagram 700 depicts a schematic block diagram illustrating additional aspects or elements of device 600 that can automatically generate policies for new activities in a network in compliance with ZTA requirements in accordance with certain embodiments of this disclosure.

At reference numeral 702, device 600 can determine a probability 704 of linked entity pair 628. Such can be similar to probabilities computed at reference numerals 306 and 308 of FIG. 3. In some embodiments, probability 704 can be determined as a function of distance computation 706 on top of the learned embedding space 622.

At reference numeral 708, device 600 can sort a group 710 of linked entity pairs 628. This sorting can be according to associated probabilities 704 determined at reference numeral 702. As illustrated, in some embodiments, such can result in sorted, first-order relationships 712 between members of the group 710 of linked entity pairs 628.

At reference numeral 714, device 600 can generate high-order relationships 716 between members of the group 710 of linked entity pairs 628. In some embodiments, the high-order relationships 716 can be based on relational paths.

At reference numeral 718, device 600 can merge first-order relationships 712 and high-order relationships 716. Such can result in a linked entity set 720. At reference numeral 722, device 600 can generalize linked entity set 720 to candidate policies 724 for new activity 614 as well as similar future new activities 614.

Example Methods

Figure 8:
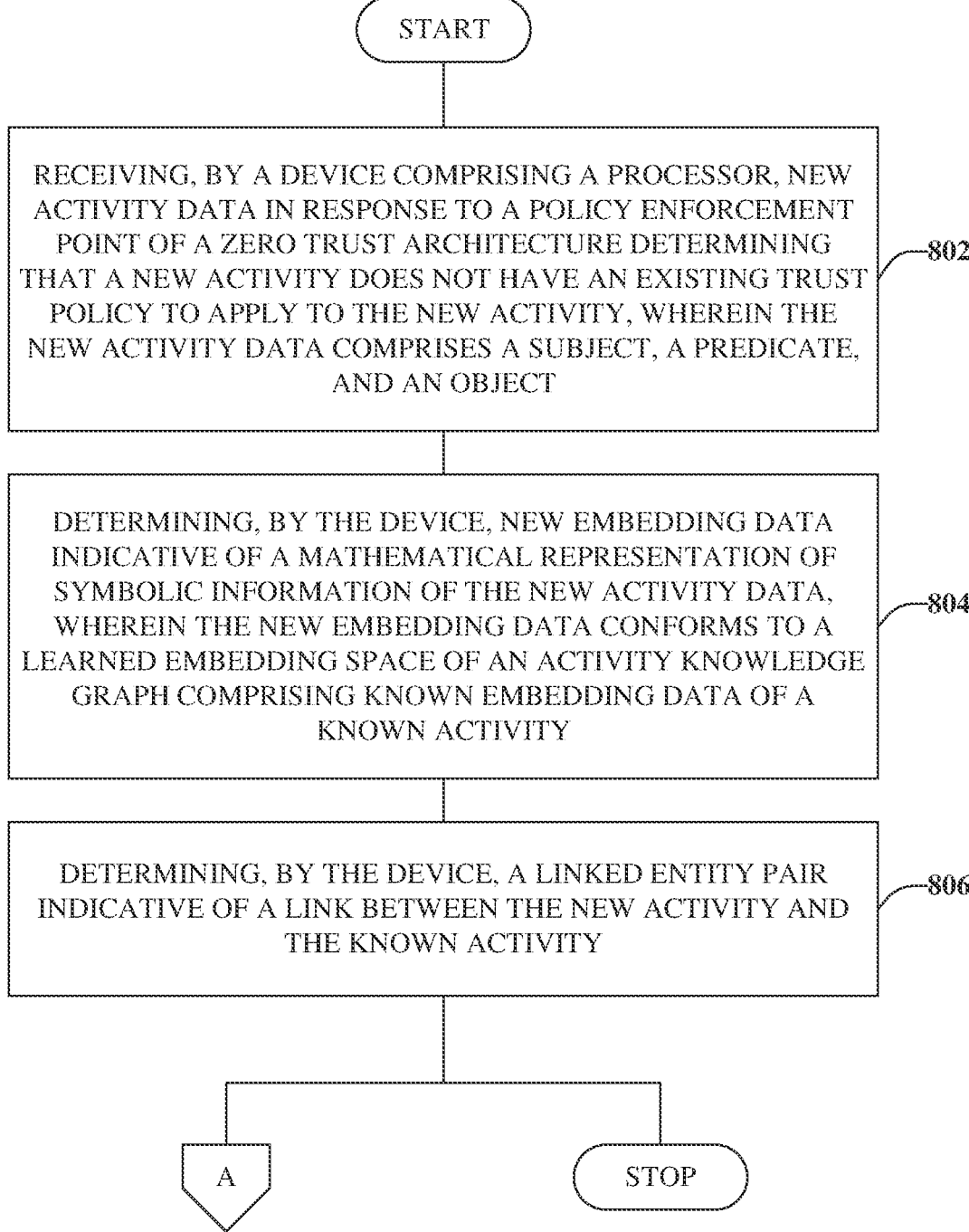
FIG. 8 illustrates an example method that can automatically generate policies for new activities in a network in compliance with ZTA requirements in accordance with certain embodiments of this disclosure.
Figure 9:
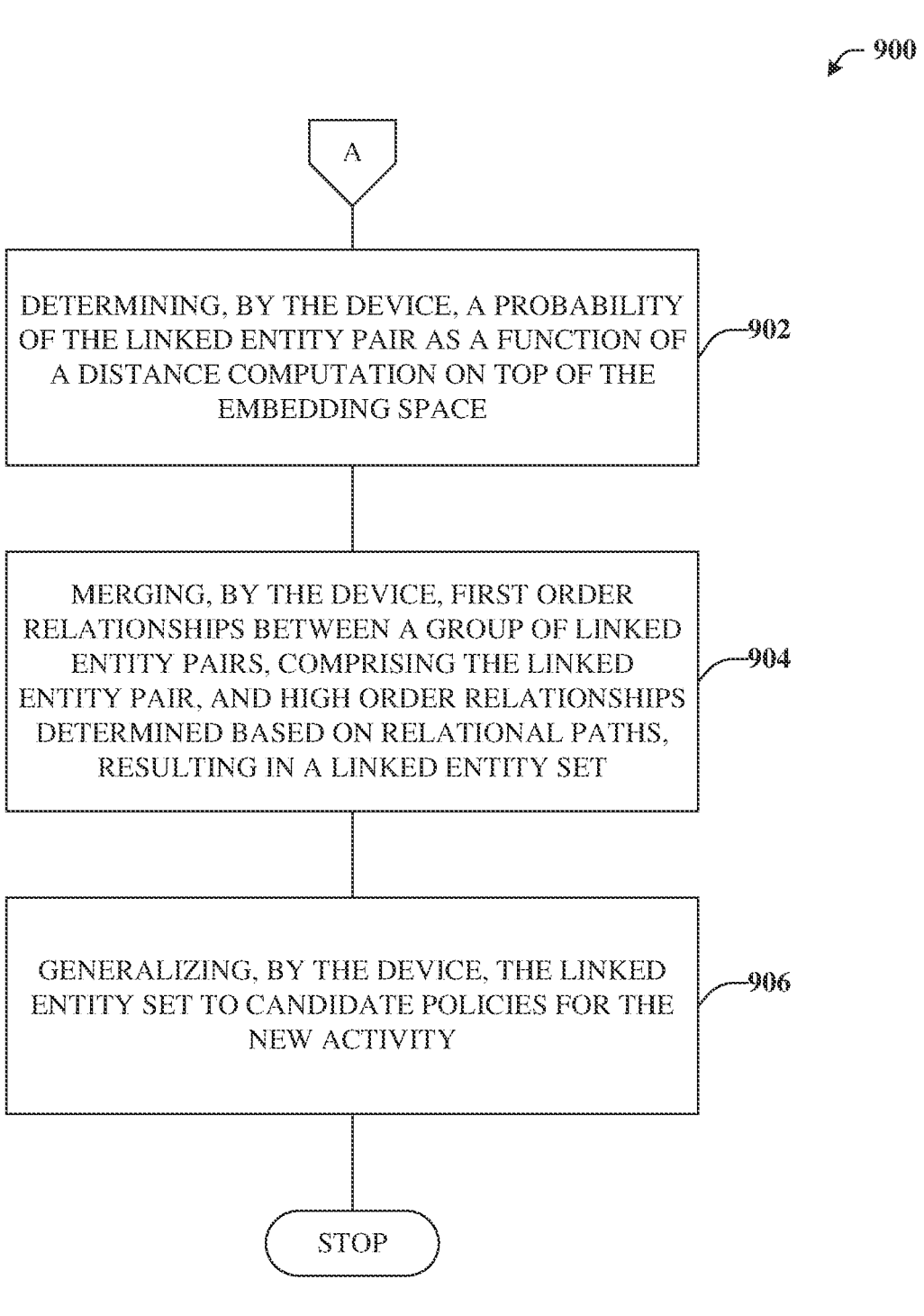
FIG. 9 illustrates an example method that can provide for additional aspect or elements in connection with automatically generating policies for new activities in a network in compliance with ZTA requirements in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can automatically generate policies for new activities in a network in compliance with ZTA requirements in accordance with certain embodiments of this disclosure. While method 800 describes a complete method, in some embodiments, method 800 can include one or more elements of method 900, as illustrated by insert A.

At reference numeral 802, a device comprising a processor can receiving new activity data. For example, the new activity data can be received in response to a policy enforcement point of a zero trust architecture determining that the new activity does not have an existing trust policy to apply to the new activity. In some embodiments, the new activity data can be formatted as a triple and can comprises a subject, a predicate, and an object.

At reference numeral 804, the device can determine new embedding data. The new embedding data can be indicative of a mathematical representation of symbolic information of the new activity data. The new embedding data can conform to a learned embedding space of an activity knowledge graph comprising known embedding data of a known activity.

At reference numeral 806, the device can determine a linked entity pair. This linked entity pair can be indicative of a link between the new activity and the known activity. Method 800 can terminate or proceed to insert A, which is further detailed in connection with FIG. 9.

Turning now to FIG. 9, exemplary method 900 is depicted. Method 900 can provide for additional aspect or elements in connection with automatically generating policies for new activities in a network in compliance with ZTA requirements in accordance with certain embodiments of this disclosure.

At reference numeral 902, the device introduced at reference numeral 802 comprising a processor can determine a probability of the linked entity pair. In some embodiments, the probability of the linked entity pair can be determined as a function of a distance computation on top of the embedding space.

At reference numeral 904, the device can merge first-order relationships between a group of linked entity pairs, comprising the linked entity pair, and high-order relationships determined based on relational paths. Such can result in a linked entity set.

At reference numeral 906, the device can generalize the linked entity set to candidate policies for the new activity.

Example Operating Environments

Figure 10:
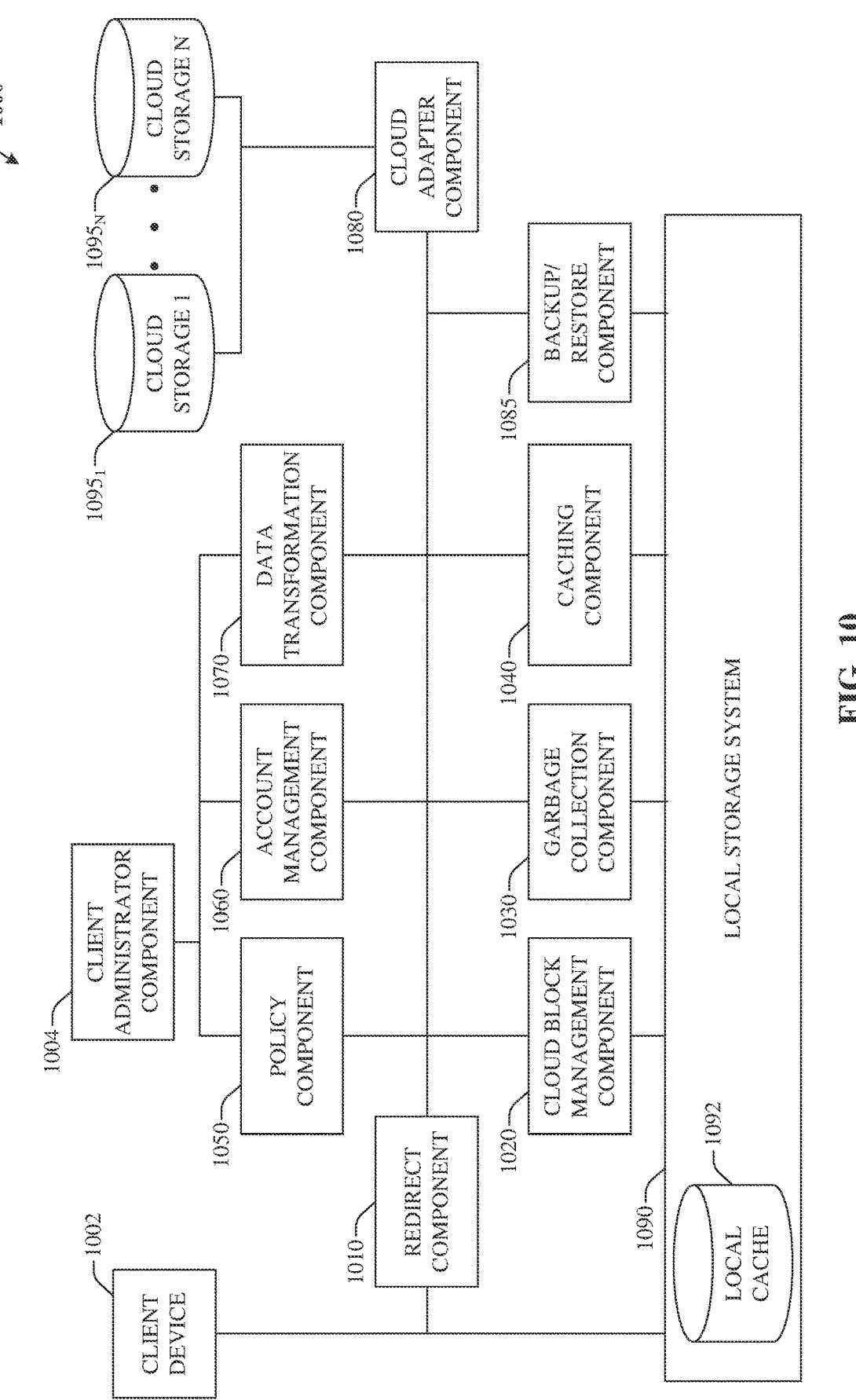
FIG. 10 illustrates a block diagram of an example distributed file storage system that employs tiered cloud storage in accordance with certain embodiments of this disclosure.
Figure 11:
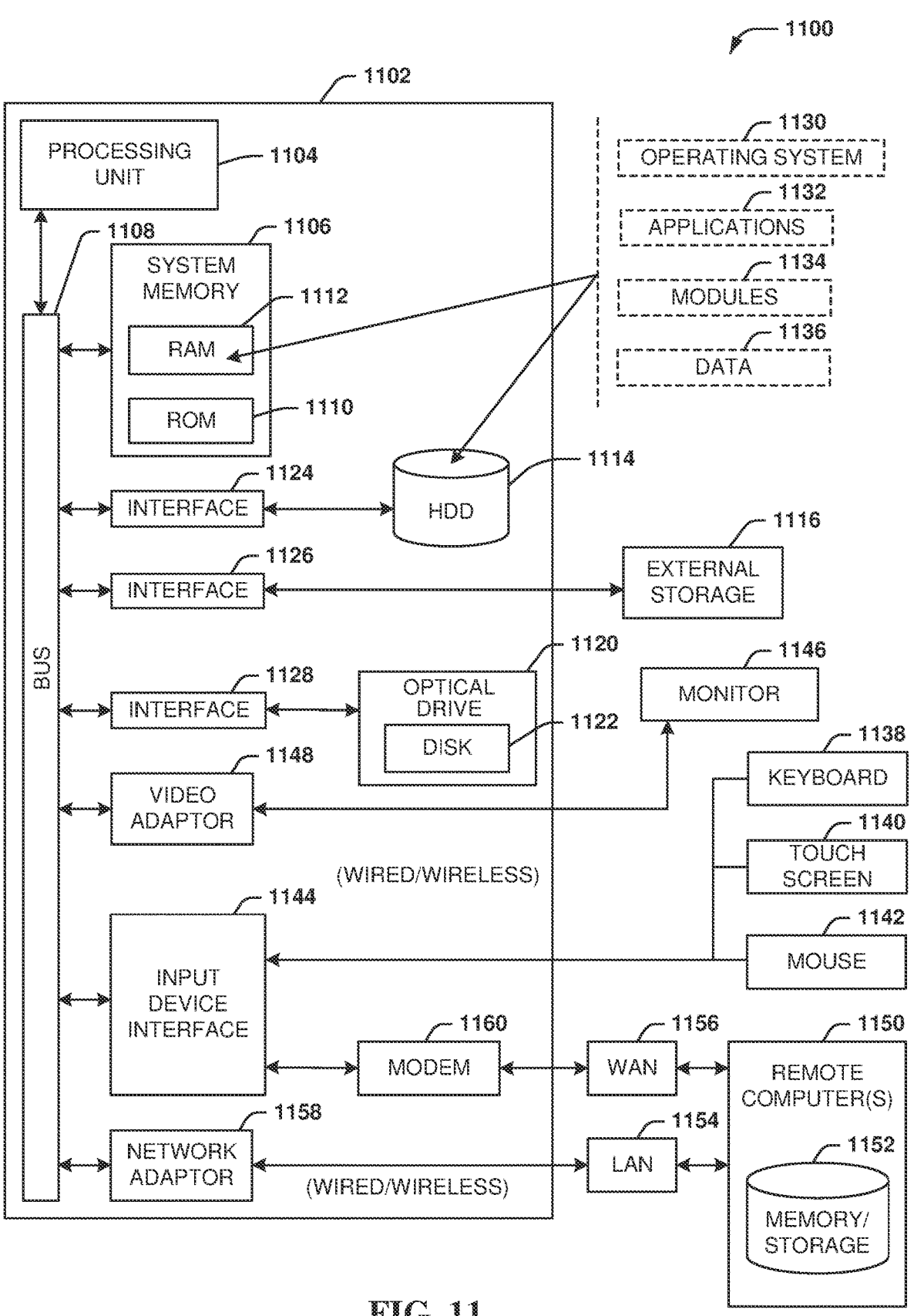
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 1095$_1$ and cloud storage N 1095$_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An online platform employing a zero trust architecture for cyber security, comprising:
at least one processor; and
at least one memory that stores executable instructions that, when executed by the at least one processor, facilitate performance of operations, comprising:
determining, by a policy enforcement point of the zero trust architecture, that new activity data describing a new activity attempting to be performed on the online platform does not have an existing trust policy to apply to the new activity; and
prior to allowing the new activity to be performed on the online platform:
generating, by a graph-based machine learning model, a new embedding of the new activity data, wherein the new embedding conforms to a learned embedding space of an activity knowledge graph comprising known embeddings of known activities, wherein each embedding of the known embeddings is based on a triple comprising a subject of an activity, a predicate of the activity, and an object of the activity, wherein nodes of the activity knowledge graph represent the subjects and the objects, and wherein edges of the activity knowledge graph represent the predicates;
determining linked entity pairs indicative of respective links between the new activity and the known activities;
determining respective probabilities of the linked pairs, wherein the respective probability of the linked pair is based on at least one of:
a first probability of the subject of the new activity and the predicate of the known activity of the linked pair, or a second probability of the object of the new activity and the predicate of the known activity of the linked pair;

adding a predefined quantity of the linked pairs having highest probabilities to a first order set of top linked pairs;

based on the top linked pairs of the first order set, generating, using a defined process on the activity knowledge graph, a high order set comprising relational path tuples for the known activities of the top linked pairs, wherein each relational path tuple comprises:

the subject of the known activity associated with the relational path tuple, the object of the known activity associated with the relational path tuple, and a predicate path comprising a plurality of predicates on a relational path between the subject and the object of the known activity associated with the relational path tuple;

merging the first order set and the high order set to generate a linked entity set;

mapping the linked entity set to candidate trust policies based on known relationships between the activity knowledge graph and clauses of a policy database;

based on one or more clauses of the candidate trust policies, generating a new trust policy for the new activity in compliance with the zero trust architecture; and enforcing the new trust policy on the new activity attempting to be performed on the online platform.

2. The online platform of claim 1, wherein the new activity data is formatted as the triple of the new activity.

3. The online platform of claim 1, wherein the learned embedding space is a result of training of the graph-based machine learning model on the activity knowledge graph.

4. The online platform of claim 3, wherein the operations further comprise adding the new trust policy to the policy database.

5. The online platform of claim 1, wherein the respective probability of the linked pair is further based on a function of a distance between the new activity and the known activity of the linked pair.

6. The device online platform of claim 1, wherein the operations further enforcing the new trust policy comprises temporarily employing the new trust policy while the new trust policy is being verified.

7. The online platform of claim 6, wherein temporarily employing the new trust policy comprises selectively applying the new trust policy based on a sensitivity of the new activity.

8. A non-transitory computer-readable medium comprising instructions that, in response to execution, cause an online platform employing a zero trust architecture for cyber security and comprising at least one processor to perform operations, comprising:

determining, by a policy enforcement point of the zero trust architecture, that new activity data describing a new activity attempting to be performed on the online platform does not have an existing trust policy to apply to the new activity; and prior to allowing the new activity to be performed on the online platform:

generating, by a graph-based machine learning model, a new embedding of the new activity data, wherein the new embedding conforms to a learned embedding space of an activity knowledge graph comprising known embeddings of known activities, wherein each embedding is based on a triple comprising a subject of an activity, a predicate of the activity, and an object of the activity, wherein nodes of the activity knowledge graph represent the subjects and the objects, and wherein edges of the activity knowledge graph represent the predicates;

determining a linked entity group indicative of a group of linked entity pairs indicative of respective links between the new activity and the known activities;

determining respective probabilities of the linked pairs, wherein the respective probability of the linked pair is based on at least one of:

a first probability of the subject of the new activity and the predicate of the known activity of the linked pair, or a second probability of the object of the new activity and the predicate of the known activity of the linked pair;

adding a predefined quantity of the linked pairs having highest probabilities to a first order set of top linked pairs;

based on the top linked pairs of the first order set, generating, using a defined process on the activity knowledge graph, a high order set comprising relational path tuples for the known activities of the top linked pairs, wherein each relational path tuple comprises:

the subject of the known activity associated with the relational path tuple, the object of the known activity associated with the relational path tuple, and a predicate path comprising a plurality of predicates on a relational path between the subject and the object of the known activity associated with the relational path tuple;

merging the first order set and the high order set to generate a linked entity set;

mapping the linked entity set to candidate trust policies based on known relationships between the activity knowledge graph and clauses of a policy database;

based on one or more clauses of the candidate trust policies, generating a new trust policy for the new activity in compliance with the zero trust architecture; and enforcing the new trust policy on the new activity attempting to be performed on the online platform.

9. The non-transitory computer-readable medium of claim 8, wherein the new activity data is formatted as the triple of the new activity.

10. The non-transitory computer-readable medium of claim 8, wherein the learned embedding space results from training the graph-based machine learning model on the activity knowledge graph.

11. The non-transitory computer-readable medium of claim 10, wherein the operations further comprise adding the new trust policy to the policy database.

12. The non-transitory computer-readable medium of claim 8, wherein the respective probability of the linked e pair is further based on a function of a distance between the new activity and the known activity of the linked pair.

13. The non-transitory computer-readable medium of claim 8, wherein enforcing the new trust policy comprises temporarily employing the new trust policy while the new trust policy is being verified.

14. A method, comprising:

determining, by an online platform employing a zero trust architecture for cyber security and comprising at least one processor, that new activity data describing a new activity attempting to be performed on the online platform does not have an existing trust policy to apply to the new activity;

prior to allowing the new activity to be performed on the online platform:

generating, by the online platform, using a graph-based machine learning model, a new embedding of the new activity data, wherein the new embedding conforms to a learned embedding space of an activity knowledge graph comprising known embeddings of a known activities, wherein each embedding is based on a triple comprising a subject of an activity, a predicate of the activity, and an object of the activity, wherein nodes of the activity knowledge graph represent the subjects and the objects, and wherein edges of the activity knowledge graph represent the predicates;

determining, by the online platform, linked pairs indicative of respective links between the new activity and the known activities;

determining, by the online platform, respective probabilities of the linked pairs, wherein the respective probability of the linked pair is based on at least one of:

a first probability of the subject of the new activity and the predicate of the known activity of the linked pair, or a second probability of the object of the new activity and the predicate of the known activity of the linked pair;

adding, by the online platform, a predefined quantity of the linked pairs having highest probabilities to a first order set of top linked pairs;

based on the top linked pairs of the first order set, generating, by the online platform, using a defined process on the activity knowledge graph, a high order set comprising relational path tuples for the known activities of the top linked pairs, wherein each relational path tuple comprises:

the subject of the known activity associated with the relational path tuple, the object of the known activity associated with the relational path tuple, and a predicate path comprising a plurality of predicates on a relational path between the subject and the object of the known activity associated with the relational path tuple;

merging the first order set and the high order set to generate a linked entity set;

mapping, by the online platform, the linked entity set to candidate trust policies based on known relationships between the activity knowledge graph and clauses of a policy database;

based on one or more clauses of the candidate trust policies, generating, by the online platform, a new trust policy for the new activity in compliance with the zero trust architecture; and enforcing, by the online platform, the new trust policy on the new activity attempting to be performed on the online platform.

15. The method of claim 14, wherein the new activity data is formatted as the triple of the new activity.

16. The method of claim 14, wherein the learned embedding space is a result of training of the graph-based machine learning model on the activity knowledge graph.

17. The method of claim 14, further comprising adding, by the online platform, the new trust policy to the policy database.

18. The method of claim 14, wherein the respective probability of the linked pair is further based on a function of a distance between the new activity and the known activity of the linked pair.

19. The method of claim 14, wherein enforcing the new trust policy comprises temporarily employing the new trust policy while the new trust policy is being verified.

20. The method of claim 19, wherein temporarily employing the new trust policy comprises selectively applying the new trust policy based on a sensitivity of the new activity.

* * * * *